United States Patent [19]
Johnson

[11] 4,324,484
[45] Apr. 13, 1982

[54] MICROFILM FILING SYSTEM

[75] Inventor: Delmar R. Johnson, Barrington, Ill.

[73] Assignee: Bell & Howell Company, Chicago, Ill.

[21] Appl. No.: 192,787

[22] Filed: Oct. 1, 1980

[51] Int. Cl.³ .................. G03B 13/26; G03B 15/00
[52] U.S. Cl. .................................. 355/5; 355/14 R; 355/16; 355/45; 235/463; 353/26 A; 365/127
[58] Field of Search .............. 353/26 A, 27 A; 346/77 R, 77 E; 365/126, 127; 235/462, 463; 355/3 R, 14 R, 36, 38, 40, 41, 45, 55, 16, 5

[56] References Cited

U.S. PATENT DOCUMENTS

| | | | |
|---|---|---|---|
| 3,697,176 | 10/1972 | Kuehnle et al. | 355/45 |
| 3,988,064 | 10/1976 | Sone et al. | 355/45 X |
| 4,068,934 | 1/1978 | Tanaka et al. | 353/26 A |
| 4,079,388 | 3/1978 | Takahama et al. | 355/41 X |
| 4,087,166 | 5/1978 | Rothbart et al. | 353/26 A |
| 4,174,891 | 11/1979 | Flint et al. | 353/26 A |
| 4,198,157 | 4/1980 | Johnson | 355/40 |
| 4,283,621 | 8/1981 | Pembroke | 353/26 A |

Primary Examiner—Arthur C. Prescott
Attorney, Agent, or Firm—Alan B. Samlan; J. Warren Whitesel

[57] ABSTRACT

A microfilm system stores document on film for compact and secure filing. Full-size paper copies may be made of any document in the file. A single, attractively styled, compact housing contains a preferably manually fed camera, with an electrophotographic 16 mm roll film packaged in a cassette for easy film loading and unloading. The film is processed immediately after each image is recorded so that it is ready for instant retrieval. A bar code is recorded adjacent each image, responsive to a keyboard operation. During retrieval, a high-speed film transport searches for a designated bar code. Once an image is found, it may be projected on either a screen or paper in a printing system.

28 Claims, 8 Drawing Figures

MICROFILM FILING SYSTEM

This invention relates to microfilm information storage and retrieval systems and, more particulaly, to systems for securely storing and reliably retrieving microimagery files.

The invention makes use of various structures and principles which are incorporated in a co-pending application (Ser. No. 117,205), filed Jan. 31, 1980 now U.S. Pat. No. 4,286,864, by Gordon Lysle and Kenneth R. Baur, inventors, and entitled "Photoplastic Film Recording and Monitoring Apparatus." Another system for storing and retrieving microimage data is found in U.S. Pat. No. 3,716,295 by Nakajima, Yamaguchi and Onishi and entitled "Electrostatic Microcopying Apparatus Including Film Cutting, Slitting and Inserting Means for Aperture Cards."

U.S. Pat. No. 3,147,062 (W. E. Glenn, inventor) shows an early electrostatic film for optical readout. An "Information System for Recording and Developing Apparatus" using the Glenn film is found in U.S. Pat. No. 3,154,369, H. R. Day, inventor. Another and somewhat similar electrophotographic film, which uses toner, is seen in U.S. Pat. No. 3,880,519. My U.S. Pat. No. 4,110,020 (and others) shows a system for transporting microfilm to display a selected image responsive to bar codes formed along the length of the film.

In general, the cost and inconvenience of storing and retrieving graphical information is already prohibitive and it grows every year. In addition to the monetary cost of establishing and maintaining a filing system, there is an even more serious and hidden cost of lost or damaged files. For example, the loss of a critical piece of evidence could result in a loss of a favorable decision during litigation or the loss of a dissatisfied customer.

Hence, there is a need for a filing system which does not require a substantial amount of storage space and which positively precludes lost or mutilated documents. Such a system should have search capabilities so that it can produce a desired document without requiring a substantial amount of human search time. In addition, it is desirable for the system to provide printed copy of any microimage, upon demand.

Accordingly, an object of the invention is to provide new and improved filing systems which overcome the above-cited disadvantages while providing the sought-after advantages and capabilities of microimage filing.

Another object is to provide a microfilm filing system which may store randomly-entered data, to be retrieved on command, without requiring substantial human search time.

Here, an object is to provide randomly-stored filing data on roll film which can be easily changed in a reader-printer, with or without rewinding. A further object is to enable new microfilm images to be stored on changeable reels that contain previously recorded and processed images.

In keeping with an aspect of the invention, these and other objects are accomplished by a secure microimaging filing system in a common housing that is suitable for use in an office environment. The system is used to randomly store microimages of individual documents on electrophotographic or electrosensitive film which is loaded into changeable cassettes. A bar code is recorded adjacent each microimage so that a film transport can reel and re-reel film in search of bar code-identified images related to any preselected subject matter.

If the image produced during the search is not a sought-after document, a push of a button causes the system to seek out the next document identified by the same bar code and, therefore, on the same subject matter. When the document is found, it may be either read from a projection onto a reading screen or printed out on demand.

A preferred embodiment of the invention is seen in the attached drawings, wherein.

Figure 1:
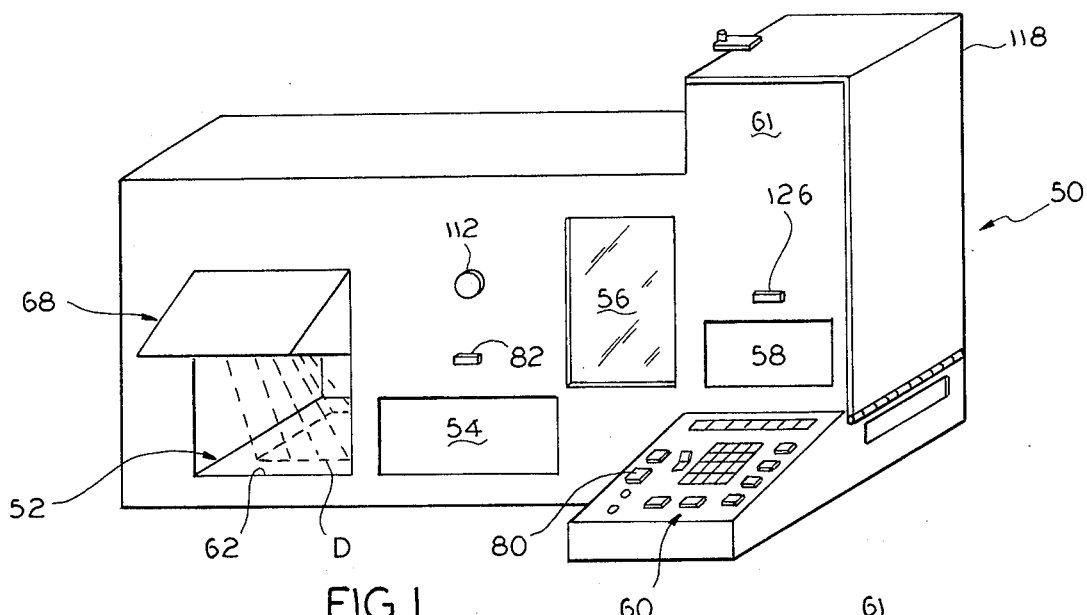
FIG. 1 is a perspective view of the exterior of the inventive camera processor reader-printer (CPRP) for a microimage filing system.
Figure 7:
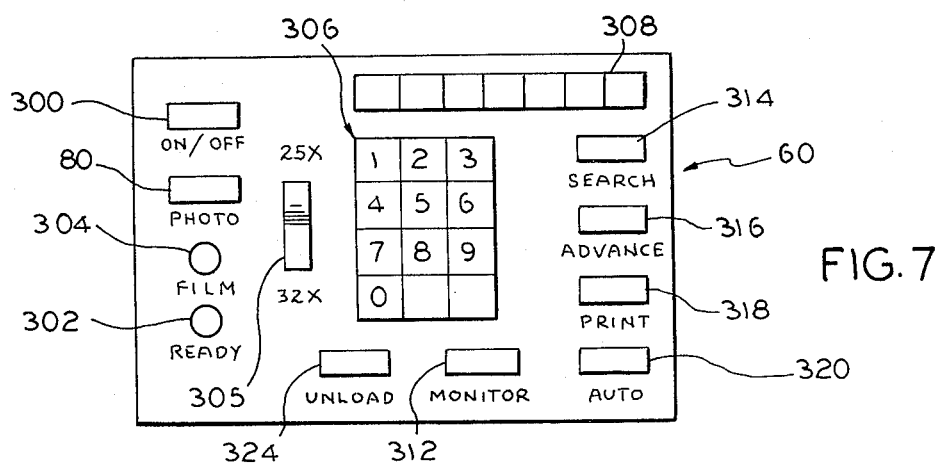
Figure 3:
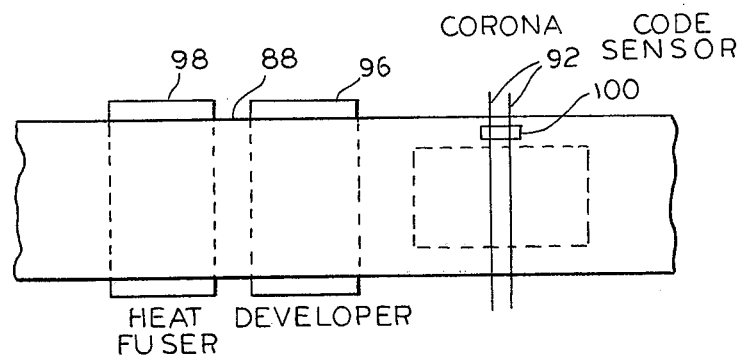
Figure 4:
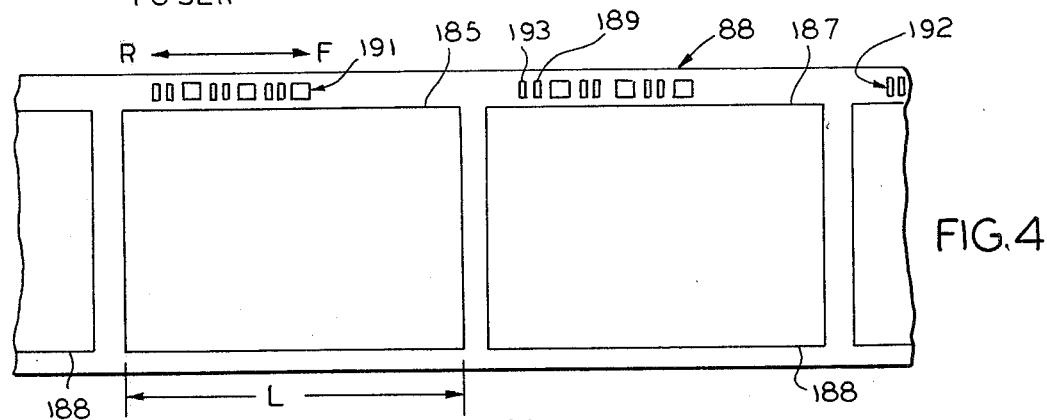
Figure 5:
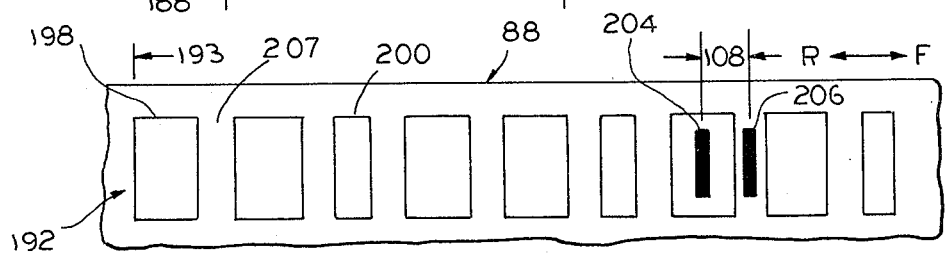
Figure 6:
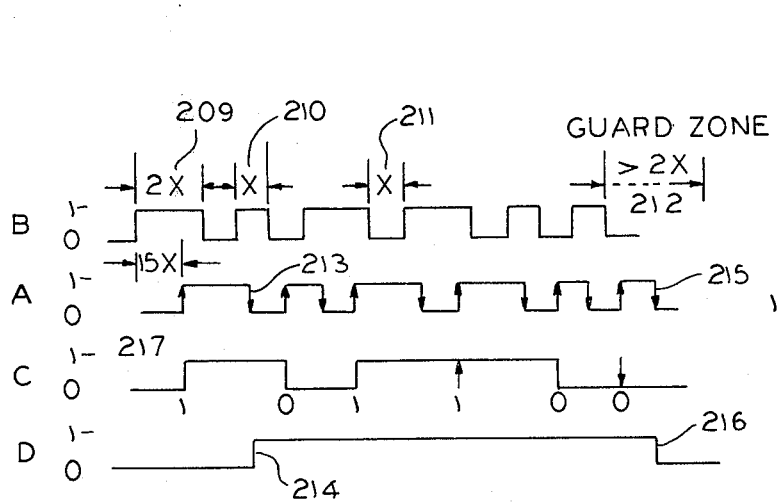
Figure 8:
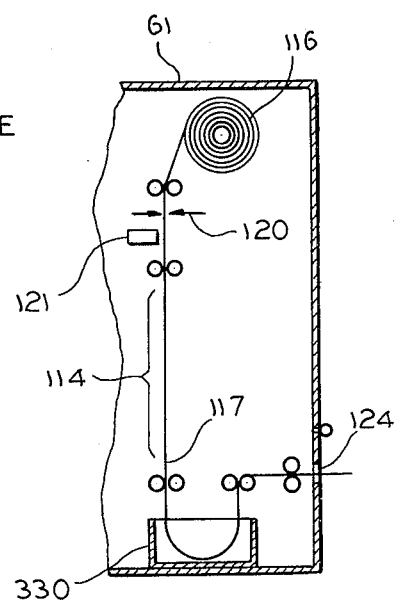

FIG. 3 schematically shows a general layout of film-carrying microimages and bar codes, together with fuser, developer and bar code-sensing stations;

FIG. 4 is a plan view of a specific microfilm with bar codes and image areas;

FIG. 5 illustrates an exemplary bar code;

FIG. 6 illustrates how the bar code is read;

FIG. 7 is a keyboard used to store bar codes on film, command the retrieval of selected data, and otherwise to control operation of the CPRP; and FIG. 8 illustrates an alternative printer section for use in the system of FIG. 1.

The inventive camera processor reader-printer (CPRP) 50 is seen in FIG. 1 as including a photographing station 52, a film cassette access cover 54, a viewing screen 56, a toner tray access panel 58, a control panel 60, and a paper storage and feed section 61.

The photographing station 52 includes a horizontal table 62 on which a document D may be placed to be photographed. Suitable light sources 64,66 (FIG. 2) are positioned to floodlight the document D. Reflectors may be provided along with the light sources 64,66. A suitable hood 68 may be provided to prevent the light sources from blinding the user. Markings may appear on the surface of table 62 to identify the maximum area which appears in the format of the camera.

Positioned above the table 62 is a mirror 70 (FIG. 2) for reflecting the light containing the image of document D onto a rotatable mirror 72. When the mirror 72 is in the position shown by full and solid lines, the image of document D passes through a shutter 76 and a lens system 78 focused upon a microfilm. The focus of the lens 78 is automatically preset for the distance from document D, reflected by mirrors 70,72 to lens 78 and film 88, when an operator places the CPRP in a "photograph" mode, as selected by a switch 80 on keyboard 60.

The cassette access cover 54 opens when an eject button 82 (FIG. 1) is pushed. Once cover 54 is opened, a cassette 84 (FIG. 2) may be slipped into position in any conventional manner. The cassette includes a suitable housing 84 having a film supply reel 86 and a take-up reel 87 mounted therein. The film 88 extends past a format area 90 where the image of document D is focused on the film by the lens system 78. The film 88 is of the electrophotographic or charge-sensitized type as described above. A suitable corona discharge is formed by a pair of corona wires 92 positioned adjacent the format area 90.

Figure 2:
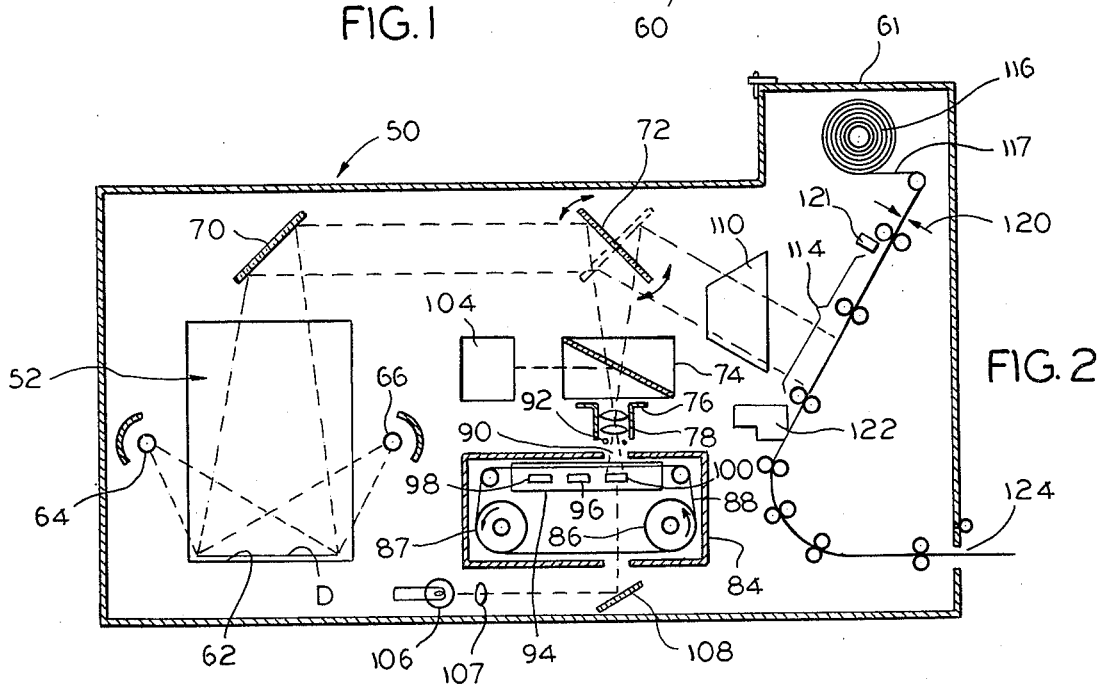
FIG. 2 is an elevation of the CPRP of FIG. 1, with the front cover removed.

A suitable cutout portion 94 in the cassette housing 84 receives elements built into the reader-printer, which are used to process the film. These elements are a developer/dryer station 96 and a fuser station 98, and a bar code reader 100 (FIGS. 2, 3). The bar code sensor 100 is positioned to read the bar code of the identified image which is located in format area 90 at the time when the code is read. Each time that an image is photographed, the film 88 is indexed to position a fresh and unexposed length of film in the format area 90. If it is desired to add images to a partially imaged roll, the bar code reader 100 and associated logic senses and reads the last recorded image and automatically increments the film forward one frame for recording a new image.

At one side of the image projection path is a mirror 74 and a bar code generator 104 which may be any suitable device for forming and projecting a lit image of the desired bar code. For example, the bar code may be a series of wide and narrow bars of light which may be selectively generated responsive to signals from a microprocessor. The resulting light image is reflected by reflecting means or mirror 74 through lens 78 and onto the edge of the film 88, at an indexing location adjacent the image which is identified by the bar code. This is the location which is read by sensor 100 when the identified image is in the format area.

Beneath the cassette 84 is a light source comprising lamp 106, a condenser lens 107 and a mirror 108. The light from lamp 106 passes through condenser lens 107, and is reflected from mirror 108 up through the image on the film in format area 90. The image then passes through lens 78, up to rotatable mirror 72 which is in the position shown by dashed lines.

A flip mirror 110 is supported on the interior of the CPRP housing in a position to be flipped into or out of the path of light reflected from the rotatable mirror 72, when it is in the dashed line position. When extended, the rectangular mirror 110 stands out angularly from the back wall of the housing, which is why it has a keystone appearance in the figure. When mirror 110 is in the path of the light reflected from mirror 72, an image is projected from the film 88 and on to the viewing screen 56 (FIG. 1). A suitable focusing mechanism, controlled by knob 112 (FIG. 1), enables the user to focus the image while it is projected onto the screen 56. The person using the system may now read the projected image.

If the mirror 110 (FIG. 2) is flipped out of the path of light, the light reflected from mirror 72 (in the dashed line position) is focused upon a format area 114.

A roll of suitable printing 116 paper 117 may be stored in an easily accessible area 61 of the reader-printer housing. The printing paper is pulled from roll 116, through blades of a cutter 120, past a corona discharge 121, any suitable number of guides and rollers, the printing format area 114, a dry toner station 122, and out a delivery slot 124. Toner may be added by pushing button 126 (FIG. 1) to open access door 58 in the front of the reader-printer housing. The resulting structure may be constructed and operated as taught in a copending application entitled "Apparatus for and Methods of Making Bimodal Electrophotographic Copies" (Ser. No. 110,427, filed Jan. 7, 1980), by Rudolph Guzik, inventor, and assigned to the Assignee of this invention.

Thus, if the mirror 110 is flipped out of the way when light from source 106 is projected through film 88, a printed copy of the projected image is delivered from the slot 124.

The bar code may take any suitable form; however, it is presently thought that the bar code (FIGS. 4–7) taught in U.S. Pat. No. 4,110,020 may be most suitable. The manner of responding to that bar code during a data retrieval search is also taught in that patent.

In greater detail, FIG. 4 shows a small section of film 88 and illustrates how the photographic images are arranged thereon. In greater detail, each photographic areas (185, for example) may have any convenient length "L" and a width "W," approximately equal to the width of the film, with suitable allowance for margins. A standard bar code 189,191,192 is found adjacent each image which is identified thereby (e.g., bar code 191 identifies image 185, code 189 identifies image 187, etc.).

A series of bar codes (such as 191, 189, 192 generated at 104 (FIG. 2)) is printed along one margin of the film and precisely located at the same relative position near each photographic image. Therefore, if the bar code 192, for example, is precisely positioned by the film transport mechanism so that a sensor is at one edge, such as 193, of the code 192. The photographic image 184 is precisely located in the format area 90.

The nature and function of the bar code is shown in FIG. 5. There are a number (here, nine) of spots or marks arranged in a series. Each binary "1" is a wide spot or mark, as at 198, and each "0" is a narrow spot or mark, as at 200. Each wide spot 198 is exactly twice as wide as a narrow spot 200. A pair of sensors or transducers 204, 206 are positioned adjacent the edge of film 88 to read the bar code as the film passes adjacent them. For example, if the spots or marks 198, 200 are dark areas recorded on transparent film (or transparent marks on dark film), the sensor or transducers 204, 206 may include light sources on one side of the film and photocells on the other side of the film. The width of the space 207 between each spot or mark is exactly the same as the width of a narrow spot 200. The sensor or transducers 204,206 are separated by a distance 208 which is exactly equal to 1.5 times the width of a narrow spot or mark 200.

It is totally irrelevant whether the film travels from left to right or from right to left. Neither direction is preferred. However, it is convenient to have an expression for distinguishing between these two directions. Therefore, one direction is arbitrarily called "forward" F and the other "reverse" R.

It should be noted that transducer 204 encounters the bar code 192 before transducer 206 encounters it, when the film travels in a forward direction. The transducer 206 encounters the bar code first when the film travels in the reverse direction. However, there is no problem, since the transducer 206 drives into one side of a shift register and the transducer 204 drives into the other side of that same shift register. Thus, the same output conductors are marked by the shift register regardless of which way the film is driven.

FIG. 6 graphically shows how the outputs of the sensors or transducers are interpreted by the associated electronic control circuits. (There is no correlation between the codes of FIGS. 5, 6.) The sensor output pulse 209 is wide, responsive to a wide spot or mark. A narrow spot or mark 200 produces a narrow pulse 210, and a space 207 between spots or marks are indicated by narrow spaces 211 between pulses. The relative widths of the pulses and spaces, and of the distance between the sensors or transducers are indicated in FIG. 6 by "X," "2X" and "1.5X." Each bar code has a guard zone 212 on one end, in which zone another bar code is forbidden. At any distance beyond the end of this guard zone which is greater than 2X (i.e., more than a wide spot or mark), a new bar code may begin. Therefore, a photographic image does not have to have a fixed and standard length. There is no need for a guard zone on the other end of the bar code because that space is protected by the next adjacent bar code.

The output of transducer 204 is shown by curve B of FIG. 6, and the output of sensor or transducer 206 is shown by curve A. Note that the output A is the same as the output B, except that there is a lag of 1.5X between the two outputs. If the direction of film travel is reversed, the pulses in curve B will lag after those in curve A, because the transducer 206 encounters the bar code before transducer 204 encounters it in reverse film travel.

The sensor or transducer having the lagging output functions as a clock or strobe for reading the leading transducer. This way, it is not necessary for a clock to maintain a precise synchronization between the film transport and the code photographic image utilization device. In greater detail, curve A has been marked with arrowheads to indicate whether the transitions in the output of transducer 206 are going positive or going negative. In this example, the associated logic circuitry is arranged to read the output of transducer 204, each time that the transition in the output of transducer 206 is going positive, as at 217, for example. Curve B is marked at the left-hand end to indicate the voltage levels representing a "1" and a "0."

By inspection, it will be seen that curve C represents the state of the output of transducer 204, at the instances when the positive going transitions occur in the output of the transducer 206. Thus, the logic circuitry "sees" the binary word "101100," as indicated by Arabic numerals below cure C. By recalling that each wide pulse in curve B is a binary "1" and that each narrow pulse is a binary "0," it is apparent from an inspection of FIG. 6 that the code originally read by the B sensor or transducer has been correctly interpreted by the logic circuitry.

The start and stop of a bar code is represented by curve D and controlled by the negative going transitions in the output of the transducer 206. The first negative going transition 213 in the output of the transducer 206 triggers a start of code detection, as indicated at 214 in curve D. As long as the bar code continues to be read from the film, the control circuitry counts and responds to negative going transitions, and curve D remains "high." After the negative going transition counter reaches a specific count, the transducers have read the last output in a bar code; therefore, on the negative going transition 215, which indicates an end of a bar code, the curve D goes from "high" to "low," as indicated at 216. The end of code signal 216 occurs on the sixth negative going transition (curve A) in FIG. 6. Since the number of spots or marks are the same in all bar codes, there is a parity check because the proper number of spots or marks must be registered at the time when curve D goes negative. (In the example here given, the parity check occurs when the circuit counts the correct number of down going transitions between edges 214,216, inclusive.)

The operation of the inventive CPRP will be understood from a description of how the keyboard (FIG. 7) may be operated and the reader-printer's response thereto.

A suitable "on/off" power switch 300 is operated and the machine warms up. After the operating temperatures are reached, a ready light 302 lights. The rotating mirror 72 is moved to or already is in the position shown by solid lines (FIG. 2). The film 88 advances until no bar code is detected, thereby indicating that unexposed film is available in or next to the format area 90. Or, if the film supply is exhausted, a "film" lamp 304 lights, and the cassette 84 is replaced by one having a fresh supply of film.

A toggle switch 305 (FIG. 7) is operated to select a magnification or reduction factor. As here shown, a push on the top of switch 305 selects a "25×" reduction and a push on the bottom selects a "32×" reduction.

If desired, the system may record $8\frac{1}{2}"\times 11"$ documents at a 25× reduction and $11"\times 14"$ documents at a 32× reduction, in which case the image display and image printing may be fixed at a 25× enlargement, thus enabling both regular and legal size documents to be printed on $8\frac{1}{2}"\times 11"$ paper. Of course, the legal size printout may also be retained for those who want it.

At any time after "ready" lamp 302 lights, a document D placed within index lines on the horizontal table 62 (FIGS. 1, 2) may be photographed. Any suitable file number is keyed on a keyboard 306 and displayed by both an LED display 308 and the bar code generator 104. The display at 308 is in human readable symbology and the display at 104 is in machine readable symbology, and is similar to the code seen in FIG. 5. Next, the photo button 80 is pushed. Light sources 64,62 floodlight the document and shutter 76 operates. Simultaneously, the image of document D and the bar code displayed by bar code generator 104 are recorded on the film. For example, this could be bar code 189 (FIG. 4) and document image 187. Then, the shutter 76 closes and the film 88 advances one image area. The file number remains the same until a new file number entry is keyed in.

It is also possible for provisions to be made to the bar code system such that extra digits are included to identify a month and/or year. Thereafter, if it is desired to retrieve documents of one file for a certain time period, the bar code already has as part of its code a time frame reference.

Hence, it is seen that any and all documents may be recorded in any random order. Each document has its own file number associated therewith, which may be any arbitrarily assigned number. Normally, the documents are recorded in the chronological sequence in which they are processed. No presorting of the documents is necessary in contrast to conventional filing systems where documents are typically placed in filing sequence to make the filing process more efficient.

In an alternative embodiment, one subject or file is assigned a file number as was previously done. However, the system is programmed to assign a block of image frames to the file number the first time the file number is entered for recording. Each time the file number is keyed in for recording, the documents will be recorded in the assigned block until the block is filled. At that time, a new block of image frames will be assigned to the file number. For example, assume subject 1 is assigned a file number 500 which is keyed in on keyboard 306. The bar code generator 104 will display the number in bar code form. Assume the system is programmed to set aside ten frames for each file number. The first document of subject 1 fills the first frame which also has the bar code adjacent the frame. On subsequent entries of documents to subject 1, the remaining frames are filled and either the complete bar code or just a "blip" indicates the presence of an image.

When all ten frames are filled, the system assigns a second block of ten frames and repeats the procedure.

The document retrieval begins by keying in the file number of a desired document. The file number may be obtained from any of a number of conventional means such as storing on a "Rolodex" file or index card system. The desired file number is displayed on an LED display at 308. When the operator is satisfied that the correct file number is then displayed, a search push button 314 is pushed to initiate retrieval. Then the film is transported as taught by U.S. Pat. No. 4,110,020, and the searching or bar code reading system is activated. The system logic is set up to cause the most recently recorded frame that corresponds to the keyed-in file number to be displayed. If that is not the sought-after document, the "advance" push button 316 is pushed and the film moves to find and display the next document identified by the bar code corresponding to the keyed file number. The process is repeated by pushing the advance button 316 repeatedly, until the sought-after document is found.

If the alternate recording mode described above is used, retrieval will also be somewhat different. The first document in a block can be retrieved and then adjacent documents in the block (which are all the same subject file) may be viewed without going through the searching procedures. This is accomplished by means within the web control system to increment forward one image frame at a time. Some users of the system may find this a preferential recording and retrieving system, as compared to a completely random photographing system in which blocks of image areas are not set aside for a particular file number.

The controls within the CPRP may calculate when a recordable area is present so that images of one subject file are not recorded into a block set aside for another subject file. This may be accomplished by means of the bar code sensor, microprocessors, and control systems which are known to those skilled in the art.

When a desired document appears on screen 56, "print" push button 318 may be pushed. Flip mirror 110 retracts and the image projected from film 88 is focused upon the format area 114 of the printing paper. A printed copy of the projected image is made and delivered through slot 124.

If it should be desirable to print out an entire file, the above-described sequence is followed. However, the "auto" push button 320 is pushed instead of the "advance" push button 316 or the print push button 318. This time, the reader-printer automatically searches for every successive image identified by the keyed bar code, printing a copy of each. Thus, the unattached reader-printer 50 can retrieve every document on film 88 which is identified by the desired file number.

FIG. 8 shows an alternative printer, which has parts identified by the same reference numerals that are used in FIG. 1. This time, the paper 117 dips into a tank 330 of liquid toner. Still other forms of printers may be used.

The advantages of the inventive system should now be apparent. In use, documents from many different files are photographed in a random sequence, at the times when they are normally filed. As each document is photographed, its file number is recorded by an appropriate bar code on the edge of the film adjacent to the image. Images are individually processed on electro-sensitive film immediately after exposure and thus are available for retrieval within seconds after the exposure is made. During file lookup, the file number is keyed into the system and the film winds to the last recorded image and then begins searching. In this manner, the first retrieved frame is always the most recently filed document corresponding to the file subject keyed in. If a time reference is keyed in on photographing and is now part of the bar code, retrieval is simplified. When desired, any displayed image can be copied on to paper; or, all documents in a selected file may be automatically copied.

Features of this system are such that each user has a cassette that contains several thousand images of the user's files. The CPRP is contained in a single cabinet. As long as the film is retained, there is absolute file integrity since no individual document can be lost off a roll and the film sequence always provides a chronologically correct file.

The future system development is almost limitless since it may take advantage of the continuing electronic revolution. While film is clearly the most viable present day storage medium, the system is also applicable to any other suitable technology such as those used in video signal recording, either disc or tape.

Those who are skilled in the art will readily perceive how to modify the system. Therefore, the appended claims are to be construed to cover all equivalent structures which fall within the true scope and spirit of the invention.

I claim:

1. A microfilm document recording and retrieval system comprising means for microcopying on a web images of individual documents; means for simultaneously recording on said web an operator-assigned, document-identifying, machine-readable code adjacent each microcopied document; means for immediately processing the microcopied image so that it is available for retrieval; means for identifying to said system a preselected one of said machine readable codes; means for searching over said web for said preselected code; and means responsive to finding said preselected code for selectively projecting the image identified thereby onto either a screen or a printing mechanism.

2. The system of claim 1 and means for packaging said web in a cassette for magazine-loading a supply of said web, whereby individual system users may keep their files on webs in their own easily inserted cassettes.

3. The system of claim 1 or 2 and means for searching over said web for retrieving all documents recorded under a selected one of said machine-readable codes.

4. The system of claim 3 wherein said machine-readable codes are file symbols identifying a plurality of related documents.

5. The system of claim 4 wherein said search means advances said web from one document having a particular file symbol to the next recorded document having the same file symbol in response to sequentially applied manually operated image advance means.

6. The system of claim 4 wherein said search means automatically advances through said web to print out every document identified by said selected one of said file symbol.

7. The system of claim 4 wherein said web is an electrophotographic film which is processed immediately after it is struck by the light of said document image.

8. The system of claim 7 wherein said processing is responsive to an application of heat.

9. The system of claim 4 wherein said web is an electrophotographic film which is processed by applying a toner to said film after it is struck by the light of said document image and then fixing said toner.

10. A process for filing and retrieving documents, said process comprising the steps of:
  a. microcopying documents in a random order on a web of microimaging material;
  b. identifying each document recorded on said web by a manually-assigned, machine-readable file symbol which is formed on the web at the time when the microcopy is made;
  c. preselecting any one of said machine-readable file symbols;
  d. searching over said web for a document identified by said preselected file symbol; and
  e. selectively either displaying or printing said document identified by said file symbol.

11. The process of claim 10 and the added step of prepackaging of said web material in easily changeable cassettes whereby the system storage capacity can be expanded by switching cassettes.

12. The process of claim 10 and the added step of selecting different image reduction sizes at the time of microcopying so that all of said documents may be printed out at the same magnification ratio on the same size paper despite variations in the size of the original documents.

13. The process of claim 10, 11 or 12 wherein said web is electrosensitive film.

14. The process of claim 13 and developing said film by heating it.

15. The process of claim 13 and developing said film by applying a toner to said film after it is struck by the light of said document and then fixing said toner.

16. The process of claim 15 and the added step of automatically finding and printing every document which is identified on a single web by the same machine readable file symbol.

17. The process of claim 15 and the added step of advancing said web from document to document identified by the same machine readable file symbol responsive to manually applied advance control signals.

18. A microimage file system in a unitary machine having an image copy area, a microweb exposure and processing area, and an image display and printing area, said copy area comprising means for illuminating documents to be copied, means for transmitting images of said lit documents from said copy area to said exposure and processing area, means for adding manually selected machine readable file identification codes adjacent said transmitted image in said exposure and processing area, means for simultaneously recording said transmitted image and said codes on a charge-sensitized medium in said exposure and processing area, means for processing said image and codes, means responsive to a selection of a machine-readable code for retrieving at least one of those recorded images which are identified by said selected code, and means responsive to retrieval of said images for projecting said retrieved images from said exposure and processing area to said display and printing area.

19. The unitary machine of claim 18 and rotatable mirror means for selectively diverting said transmitted images to or diverting said projected images from said exposure and processing area.

20. The unitary machine of claim 18 and light beam reflecting means interposed adjacent a path of said light transmission to transmit said images from a first source and said codes from a second source to said exposure and processing area.

21. The unitary machine of claim 18 and a multiposition flip mirror means in a path of said projected images, means responsive to said flip mirror means in one position for diverting said projected image onto a viewing screen and responsive to said flip mirror means in another position for divertng said projected image onto a printing medium.

22. The unitary machine of claim 18, 19, 20 or 21 wherein said medium is prepackaged for easy insertion or removal in said exposure and processing area whereby image storage capacity may be increased by switching prepackaged media.

23. The unitary machine of claim 22 and means for advancing said medium from image to image identified by the same code in order to review a plurality of the images identified by the same code responsive to a manual command.

24. The unitary machine of claim 22 and means for automatically printing all images recorded on said non-light-sensitive medium which are identified by the same code.

25. A process for filing and retrieving documents, said process comprising the steps of:
  a. assigning a block of image frames on a web of microimaging material;
  b. identifying each block by a manually-assigned, machine-readable file symbol;
  c. assigning related documents to the same machine-readable file symbol;
  d. microcopying related documents in the assigned block on the web having the same file symbol;
  e. preselecting any one of said machine-readable file symbols;
  f. searching over said web for said machine-readable file symbol; and
  g. selectively either displaying or printing said documents identified by said file symbol.

26. The process of claim 25 wherein said web is electrophotographic film.

27. The process of claim 26 wherein only the first related document of each block has the machine-readable file symbol assigned and formed on the web at the time the microcopy is made.

28. The process of claim 27 wherein each document recorded in a block subsequent the first document has a blip mark recorded adjacent said document.

* * * * *